United States Patent [19]

Pohl

[11] Patent Number: 4,799,758
[45] Date of Patent: Jan. 24, 1989

[54] ADAPTOR FOR A LIGHT WAVEGUIDE PLUG CONNECTOR

[75] Inventor: Peter Pohl, Krailling, Fed. Rep. of Germany

[73] Assignee: Siemens Aktiengesellschaft, Berlin and Munich, Fed. Rep. of Germany

[21] Appl. No.: 75,993

[22] Filed: Jul. 21, 1987

[30] Foreign Application Priority Data

Jul. 24, 1986 [DE] Fed. Rep. of Germany ....... 3625075

[51] Int. Cl.⁴ ............................. G02B 6/36; G02B 6/38
[52] U.S. Cl. .............................. 350/96.2 R; 350/96.21
[58] Field of Search ................. 350/96.20, 96.21, 96.22

[56] References Cited

U.S. PATENT DOCUMENTS

| 4,291,943 | 9/1981 | Binek et al. ................. 350/96.22 |
| 4,330,172 | 5/1982 | Monaghan et al. ............. 350/96.21 |
| 4,445,752 | 5/1984 | Faber et al. ................. 350/96.21 X |
| 4,522,463 | 6/1985 | Schwenda et al. ............. 350/96.21 |
| 4,711,519 | 12/1987 | Smulders ................... 350/96.20 |
| 4,715,674 | 12/1987 | Schulz et al. ............... 350/96.22 |

FOREIGN PATENT DOCUMENTS 2516858 1/1983 Fed. Rep. of Germany .
8525560.2 1/1986 Fed. Rep. of Germany .

OTHER PUBLICATIONS

Bocinski et al., "Pluggable Connector System with Housing Retention and Polarization", *IBM Technical Disclosure Bulletin*, vol. 26, No. 7A, Dec. 1983, pp. 3156–3157.
Patent Abstract of Japan—(58-52612—Mar. 28, 1987), vol. 7, No. 138, (P-204), Jun. 16, 1983.

*Primary Examiner*—William L. Sikes
*Assistant Examiner*—Akm E. Ullah
*Attorney, Agent, or Firm*—Hill, Van Santen, Steadman & Simpson

[57] ABSTRACT

An adaptor for a light plug connector comprises a housing with a through-opening extending between a first and second end and has a pair of webs on side walls of the housing extending into the opening adjacent the second end, said pair of webs merging with the top wall of the housing and having open, free ends to receive channels of a plug part moved transversely to the axis of the opening into the housing. A spring clip having a U-shaped structure with portions overlying the webs to entrap or interlock a plug part assembled thereon and other portions engage projections on a second plug part inserted into the other or first end of the housing.

8 Claims, 2 Drawing Sheets

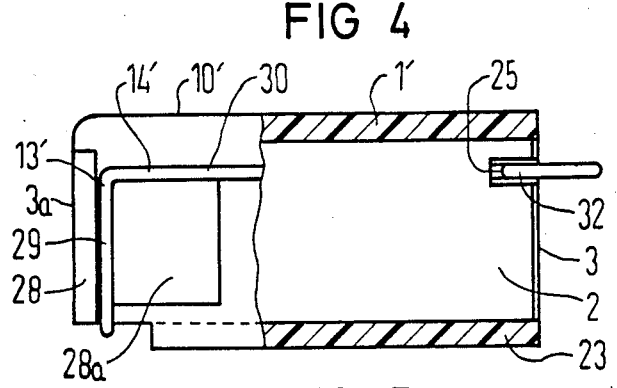
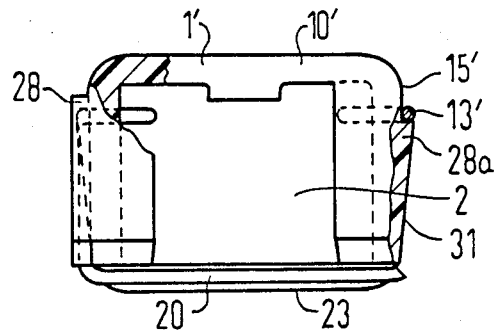
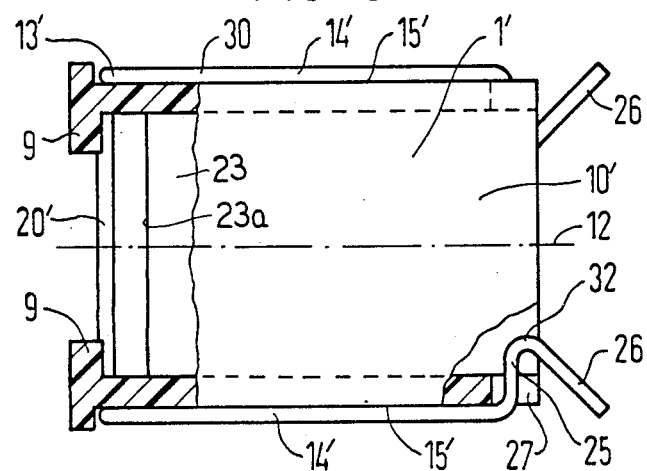

ADAPTOR FOR A LIGHT WAVEGUIDE PLUG CONNECTOR

BACKGROUND OF THE INVENTION

The present invention is directed to an adaptor or transition piece for light waveguide plug connectors which have two pluggable parts. The transition piece or adaptor has a housing which has a through-opening for introduction of the two plug connector parts proceeding from the two ends of the housing which face away from one another.

In German Pat. No. 25 16 858, an adaptor is disclosed, which adaptor is composed of a hollow, cylindrical sleeve into which pin-shaped plug connector parts can be inserted from opposite ends. The pin-shaped plug connector parts each concentrically contain a light-conducting fiber whose free end is flush with the front end of the pin-shaped part of the plug connector. Given suitable matching of the inner cavity of the adaptor to the pin-shaped parts of the plug connector, these are seated play-free in the adaptor and have their front ends lying against one another. In order to retain the two plug connector parts with the front ends lying against one another, a spring, which surrounds the adaptor, is provided and the ends of the springs engaged into annular grooves, which have been formed in each of the two plug connector parts at a point outside of the adaptor so that the spring holds the plug parts in the adaptor.

Another type of light waveguide plug connector has a pin-shaped part in which a light conductor fiber has one end section secured. The other part of the plug connector is constructed as a socket or bush-like member and is in communication or connected with an opto-electric or, respectively, electro-optical transducer. Since such an adjustment already occurs by the plugging of the pin-shaped part into the socket-shaped part of the plug connector, no adaptor which effects the adjustment of the two plug connector parts relative to one another is required. However, such a light waveguide plug connector between the fiber and an opto-electric or, respectively, the electro-optical transducer are frequently fashioned as double plugs, whereby the one plug connector of the double plug connects an incoming fiber to an opto-electric transducer and the other plug connector of the double plug connects an outgoing fiber to an electro-optical transducer. Over and above this, the two plug parts in a double plug are each spring-loaded in an axial direction in order to be able to compensate for tolerances between the plug parts which occur in the plugging direction. However, this results in the fact that the plug connector parts must interlock with one another in their plugged condition in order to prevent one of the two spring-loaded plug pins from pushing the other back to such a degree that it moves out of its optimum position.

SUMMARY OF THE INVENTION

It is an object of the present invention to improve an adaptor which has a through-opening for receiving plug connector parts, has the simplest possible structure and is suitable for holding two plug parts of a plug connection against one another in an operable, reliable fashion, and particularly being suitable to hold a spring-loaded, pin-shaped and socket-shaped plug connector parts in their plugged condition.

To accomplish these objects, the present invention is directed to an improvement in an adaptor for a light waveguide connection having two pluggable parts, said adaptor having a housing with a first end, a second end and a through-opening extending between said first and second ends and spring means for engaging the plug parts and holding them in the housing. The improvements are that the spring means is a U-shaped spring member having a bight portion interconnecting two legs, said spring member being mounted on the housing with the ends extending along the outer surfaces of the side walls of the housing with the bight portion being positioned adjacent one of the first and second ends and the free ends of the legs being at the other of the first and second ends, said bight portion forming means at the one end for engaging a plug part inserted into the one end for interlocking said part in said one end, and the free ends of the legs forming interlocking means for engaging a plug part inserted into the other end and holding it in said other end.

Given an uncomplicated structure of the adaptor, one thus obtains an effective latching for the plug connector parts since, for example, regions of the spring wire clip extending transverse relative to the through-opening engage behind a corresponding fashioned contour of a plug connector part in an operationally reliable fashion.

It can be provided in a further development of the invention that the housing is provided with two webs which are parallel to one another and directed inwardly toward one another. The webs are provided at the second end of the through-opening and a bottom wall adjacent the webs has a portion removed to provide free ends and at the opposite ends the top wall merges with the webs.

As a result of the above-mentioned construction, the housing is preferably connected to a socket-shaped plug connector part with the adaptor housing having the webs inserted into channels in the part or the part is moved transverse relative to the axis of the opening. These channels are provided in the socket plug connector part.

It is, thus, advantageous that the free ends of the legs of the spring are shaped to extend transversely across the recess to hold the plug part on the web portions. In another embodiment, the bight portion of the U-shaped spring is formed to extend across the recess to hold the plug part thereon.

After the insertion of the web portions into the corresponding channels of the plug connector part, the adaptor housing is thereby locked to the plug connector part, since either the bight portion of the spring wire clip or its free ends, depending on which embodiment, prevent the adaptor from sliding off of the plug connector part.

In particular, the spring wire clip can be secured to the adaptor housing by having intermediate portions of each of the legs being received in grooves formed by alternately extending projections on side walls of the housing. The projections, which form these grooves, preferably have overlapping portions to form an interlocking groove. In another embodiment, the intermediate sections of the legs have a right angle bend and are movable between two projections, one of which has a wedge-shaped profile with a sharp edge so that a portion of the leg can be latched onto the sharp edge of the profile.

The utilization of the spring action of the clip legs provides the possibilities of fastening the spring wire clip to the housing. Thus, the clip can also be subsequently secured to the adaptor housing in an uncomplicated fashion, for example, after the two plug connector parts have been plugged together.

Whereas the adaptor housing can be locked to one part of the light waveguide plug connector with the assistance of the web engaging in the channels, the other part of the light waveguide plug connector can also be preferably retained at the first end of the housing by the spring. In one embodiment of the spring, the top wall of the housing adjacent the first end has an opening or recess and the cross-piece or bight portion of the spring is urged against the edges of the opening so that when the other plug-in part is inserted, a portion is engaged by the bight portion to be locked into the housing. In the second embodiment, the legs of the spring element are bent to form V-shaped hooks which extend through slots in the side walls of the housing and will engage an abutment surface on the plug-in part. In particular, the V-shaped portions include one portion extending substantially at right angles to the axis of the through-opening and the second portion being at an acute angle to the axis. The second portion forms a camming surface that enables camming of the hook-shaped portion out of engagement to allow the abutment surface to pass thereby during insertion of the plug-in part into the housing of the adaptor.

As mentioned hereinabove, when the cross-piece or bight portion is used as an interlocking element for the plug-in part, then the plug-in part must have an abutment surface, preferably with a wedge-shaped lead end portion so that it can be engaged by the bight portion. The wedge-shaped lead-in portion enables shifting the bight portion out of the opening as the plug-in part is inserted into the housing.

Other objects and features of the invention will be readily apparent from the following description of the preferred embodiments, the drawings and claims.

BRIEF DESCRIPTION OF THE DRAWINGS

FIG. 4 is a side view of a second embodiment of the adaptor housing with portions broken away for purpose of illustration;

FIG. 5 is an end view, with portions broken away for purpose of illustration, taken from the left side of the adaptor of FIG. 4; and FIG. 6 is a plan view, with portions broken away for purpose of illustration, of the adaptor housing of FIG. 4.

DESCRIPTION OF THE PREFERRED EMBODIMENTS

Figure 1:
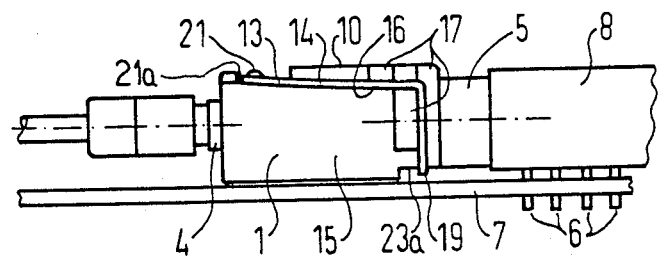
FIG. 1 is a side view of a light waveguide plug connector having the improved adaptor in accordance with the present invention.
Figure 2:
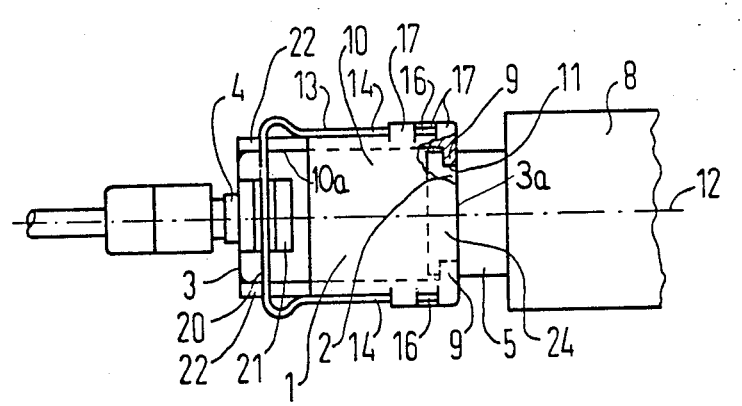
FIG. 2 is a plan view of the light waveguide plug connector of FIG. 1.

The principles of the present invention are particularly useful when incorporated in an adaptor 1 of FIGS. 1 and 2, or adaptor 1' of FIGS. 4-6. The adaptor 1 has a roughly cuboid-shaped plastic or metal housing 1, which has a top wall 10, a pair of side walls 15, and a bottom wall 23, which form a through-opening 2 (see FIG. 2), which extends from a first end 3 to a second end 3a and has an axis 12. The top wall 10 adjacent the first end 3 has a recess portion to form an opening 10a and the bottom wall 23 (FIG. 1) has a recess portion to form an opening or groove 23a adjacent the second end 3a.

The through-opening 2 is dimensioned so that a pin-shaped part 4 of a light waveguide plug connector can be plugged through the first end 3 into a bushing or socket-shaped part 5 of a light waveguide plug connector, which extends into the second end 3a. As illustrated, the socket-shaped part 5 is a portion of a reception module 8 which may be either an opto-electric or electro-optical transducer which may be fashioned as either a transmission or, respectively, a reception module. The module 8, as illustrated, has electrical terminals 6, which extend through bores of a circuit board 7 and are soldered therein to secure it on the board. The pin-shaped part 4 is connected to a waveguide and is used to connect the waveguide to the socket-shaped part 5 of the module 8.

As shown in FIG. 2, the side walls 15 of the housing 1 have webs 9 adjacent the second end 3a, and these webs extend parallel to one another and are directed inwardly towards one another to project into the through-opening 2. The webs 9 extend from the recess or opening 23a and are, thus, freely accessible at that end, however, they merge at the other end with the top wall 10, which provides a closing thereof. The part 5 has channels 11 which are matched to the webs 9. Thus, when the part 5 is moved transversely relative to the axis 12, the webs 9 are received in the channels 11 as the part 5 is moved into the connecting location in the housing 1. The coaction of the webs 9 and the channels 11 provide an axial locking or positioning of the part 5.

Figure 3:
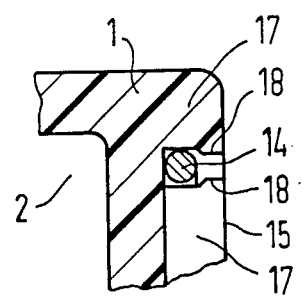
FIG. 3 is an enlarged, partial cross-sectional view taken adjacent the means for securing a leg on the side of the housing in accordance with the present invention.

To hold both the parts 4 and 5 in the housing 1, a U-shaped spring wire clip or element 13 is provided. The clip 13 has a pair of legs 14 which extend from a bight portion or cross-piece 20. The clip 13 is positioned with the legs 14 bracing the outer surfaces of the two side walls 15. The legs 13 have an intermediate portion 16 which, as illustrated in FIG. 1, has a right angle bend followed by a second right angle bend 19. The portion 16 with the first right angle bend is received in a channel formed by projections 17, which are alternately provided at one end of each of the side walls 15 adjacent the second end 3a. The projections 17 are all provided with lips 18 so that the leg portion 16 can be entrapped in the channels, as illustrated in FIG. 3. As mentioned, the free end of each of the legs 14 extends transverse to the plane formed by the portion 16, as illustrated, so that it extends into the area of the recess 23a and will hold the part 5 in the housing. In other words, the free ends 19 entrap the part 5 with the webs 9 received in the channels 11.

The cross piece or bight portion 20 of the spring wire clip 13 extends across the opening or recess 10a and, as illustrated, are resiliently pressed against edges 22 of the sides 15 at the opening 10a. When the pin part 4 of the light waveguide plug connector is inserted, a wedge shaped projection 21 on the pin part 4 can initially lift the bight portion 20 off the edges 22 of the sides 15 of the housing 1 until the cross piece engages in a groove 21a behind the piece 21. The groove 21a effectively provides abutment surfaces for the bight portion to engage and to retain the pin part 4 of the light waveguide plug connector in the housing 1.

Since the bushing-shaped or socket-shaped part 5 is retained in the housing 1 due to the engagement of the webs 9 in the channels 11 of the part 5 and the pin-shaped part 4 is retained with the assistance of the cross-piece 20, the two plug connector parts 4 and 5 are locked against one another by the adaptor in the plugged condition and can no longer be separated from one another without further ado.

At the recess 23a of the bottom wall 23, the free ends 19 of the legs 14, which free ends extend transversely inwardly relative to the walls 15 of the housing, are arranged at such a proximity of the free edges or open ends of the webs 9 that it inhibits a portion 24 of the part 5 seized by the webs 9 from sliding off of the webs.

In the exemplary embodiment of FIGS. 1–3, the clip holds the pin-shaped part 4 at one end of the housing, and at the other end of the housing prevents the bushing-shaped or socket-shaped plug connector part 5, which is retained on the housing by the webs 9 from sliding out of the engagement of the webs.

A second embodiment is illustrated in FIGS. 4–6. In this second embodiment, the adaptor has a housing 1' with side walls 15', a top wall 10' and a bottom wall 23. The bottom wall 23, at the second end 3a, is provided with a recess 23a. The side walls 15' adjacent the first end 3 are provided with slots 27. The housing 1' utilizes a spring clip 13', which has a U-shaped configuration with a bight portion 20' and leg portions 14'. As illustrated, the bight portion 20' is provided in the recess 23a adjacent the webs 9 at the second end 3a. As illustrated, the cross-piece or bight portion 20' bridges the distance between the two side walls 15' in the immediate proximity of the webs 9 and thereby prevents a part 5 of the light waveguide connector from sliding out of engagement with the webs 9. The other end of the webs 9 is closed by the top wall 10', as illustrated in FIGS. 4, 5 and 6.

In this embodiment of the adaptor, the free ends of the spring clip 13' are provided with a bent V-shaped portion which will extend through slots 27 into the through-opening 2 of the adaptor. The V-shaped hooks are formed by a first portion 25, which is bent at substantially right angle to the leg portion 14 and then has a reverse bend 32 to form a second portion 26, which extends at an acute angle relative to the axis 12 to form a bevel or a cam face, which will engage an end surface of the pin-shaped part 4 as it is being inserted into the first end 3.

As illustrated, the distance between the bends 32 are such that they are less than the diameter of the section of the pin-shaped part 4, which is to be inserted through the first end 3 of the opening 2 of the housing 1'. During initial insertion, the portions 26 engage the edge of the part and urge the two hook-shaped portions out of the opening to allow passage of the pin part. Then, the portion 25 will engage an abutment surface provided on the part to prevent removal of the part after insertion.

To mount the spring clip 13' on the housing 1, the side walls 15 are provided with mounting means, including projections 28 and 28a. The projections 28 and 28a are spaced axially apart to form a slot or channel for receiving a portion 29 of each of the legs 14'. In addition, the projection 28a has a wedge shape with a sloping surface 31 (see FIG. 5), which terminates in an upper abutment surface or sharp edge. Thus, the clip 13' has legs 14' with a first portion 29 and a second portion 30. The portion 29 is received in the groove between the projections 28 and 28a, as the second portion 30 is received on an abutment surface of the projection 28a. To assemble the clip 13', it is moved upward on the housing, as illustrated in FIG. 4, with the portions 30 moving on the surfaces 31 to spread the portions 29 and the legs 14' apart. When the legs 30 move over the sharp edge of the projections 28a, the portion 29 will fall in the groove between the projections 28 and 28a to hold the clip 13' on the housing 1'. At the same time, the hooks formed by the portions 25, 26 and 32 will be received in the slots 27.

Although various minor modifications may be suggested by those versed in the art, it should be understood that I wish to embody within the scope of the patent granted hereon all such modifications as reasonably and properly come within the scope of my contribution to the art.

I claim:

1. In an adaptor for a light waveguide connector having two pluggable parts, said adaptor having a housing with a pair of side walls, a top wall, a bottom wall, a first end, a second end, and a through-opening with an axis extending between the first and second ends, and spring means for engaging the plug parts to hold the parts in the through-opening, each of the side walls of the housing adjacent the second end being provided with a web extending inwardly into the opening, each of said webs merging with the top wall, said bottom wall having a recess adjacent the web so that the opposite ends of the webs are free ends that are freely accessible so that a pluggable part with channels can be inserted laterally transverse to the axis of the opening with the channels being received on said webs, the improvements comprising said spring means being a U-shaped spring clip having a bight portion interconnecting two legs, said spring clip being mounted on the housing with the legs extending along outer surfaces of the side walls of the housing with the bight portion being at the second end to extend across the free ends of said webs to hold the plug part thereon and the free ends of the legs being at the first end and forming interlocking means for engaging a plug part inserted into the first end and holding the plug part therein.

2. In an adaptor according to claim 1, wherein the legs adjacent the bight portion have a first portion extending at right angles to a second portion, each of said side walls having two axially spaced projections adjacent the second end with an inner projection having a wedge-shaped slanting wall extending to a sharp edge, said two projections forming a channel for receiving a first portion of each leg as the adjacent second portion engages the sharp edge of the inner projection to hold the clip with the bight portion being adjacent the free ends of said webs.

3. In an adaptor according to claim 1, wherein the free ends of each of the legs is provided with V-shaped hook portions, and said side walls have slots adjacent the first end for receiving said V-shaped hook portions so that the hook portions can extend into the through-opening through said slots.

4. In an adaptor according to claim 3, wherein the V-shaped hook portions include a first portion extending substantially parallel to the bight portion into the through-opening, a second portion extending at an acute angle to the axis of the through-opening to form a cam surface for urging the hook portions out of said through-opening as a plug is inserted therein.

5. In an adaptor for a light waveguide connector having two pluggable parts, said adaptor having a housing with a pair of side walls, a top wall, a bottom wall, a first end, a second end, and a through-opening with an axis extending between the first and second ends, and spring means for engaging the plug parts to hold the parts in the through-opening, each of the side walls of the housing adjacent the second end being provided with a web extending inwardly into the opening, each of said webs merging with the top wall, said bottom wall having a recess adjacent the web so that the opposite ends of the webs are free ends that are freely accessible so that a pluggable part with channels can be inserted laterally transverse to the axis of the opening with the channels being received on said webs, the improvements comprising said spring means being a U-shaped spring clip having a bight portion interconnecting two legs, said spring clip being mounted on the housing with the legs extending along outer surfaces of the side walls of the housing with the bight portion being positioned adjacent the first end and the free ends of the legs at the second end, said bight portion forming means at the first end for engaging a plug part to interlock the plug part in the first end of the housing and each of the free ends of the legs having a bent portion for entrapping a part on the webs adjacent the second end of the housing.

6. In an adaptor according to claim 5, wherein each of the side walls has alternately extending projections with lips for forming a side channel for receiving legs of the clip element with the lips partially overlapping to entrap said legs in said side channel.

7. In an adaptor according to claim 5, wherein the top wall of the housing adjacent the first end has a recess with the bight portion extending across said recess to engage a projection on a plug-in part to hold the part in said first end.

8. An adaptor according to claim 7, wherein each leg of the clip have a first and second portion forming a right angle bend, a third portion forming a right angle bend to a plane formed by the first and second portions, said third portions being positioned adjacent the second end to hold a plug part on said webs, said first and second portions being received in a channel formed by spaced projections on said side wall to form means for mounting the clip with the bight portion being urged against edges of the side wall adjacent the recess at said first end.

* * * * *